United States Patent [19]
Jolitz et al.

[11] Patent Number: 4,639,385

[45] Date of Patent: Jan. 27, 1987

[54] HIGH VOLTAGE HIGH VACUUM COATING

[75] Inventors: William L. Jolitz, San Jose; Richard A. Williams, Palo Alto, both of Calif.

[73] Assignee: Ford Aerospace & Communications Corporation, Detroit, Mich.

[21] Appl. No.: 781,544

[22] Filed: Sep. 30, 1985

[51] Int. Cl.$^4$ .............................................. B05D 3/02
[52] U.S. Cl. .................................... 427/386; 428/413; 428/418; 524/439; 524/701; 523/445
[58] Field of Search ............... 523/445; 524/439, 701; 427/386; 428/413, 418

[56] References Cited

U.S. PATENT DOCUMENTS

| | | |
|---|---|---|
| 3,649,542 | 1/1969 | Hasebe et al. |
| 3,779,988 | 12/1973 | Rembold et al. |
| 3,843,675 | 10/1974 | Porret et al. |
| 3,936,574 | 2/1976 | Marin .................................. 428/408 |
| 3,947,373 | 3/1976 | Sobajima et al. |

OTHER PUBLICATIONS

Sudarshan, T. S., et al, "The Effect of Chromium Oxide Coatings on Surface Flashover of Alumina Spacers in Vacuum" *IEEE Transactions on Electrical Insulation*, vol. EI-11, No. 1, Mar. 1976, pp. 32–36.

Primary Examiner—Melvyn I. Marquis
Attorney, Agent, or Firm—Edward J. Radlo; Clifford L. Sadler

[57] ABSTRACT

A conformal coating protects electrical components used in a high voltage high vacuum evironment from flashovers caused by patch charging. The coating comprises a semiconductor powder, preferably elemental boron, having a low atomic number and uniformly dispersed throughout an organic binder such an an epoxy. The coating's surface resistivity is made to be high enough so that the coating acts as an electrical insulator. On the other hand, the coating's surface resistivity is sufficiently low that any patch charge is siphoned off to the nearest conductor. The surface resistivity is regulated by the proportion of semiconductor present. The coating's secondary electron emission coefficient is 1 or just under 1. The coating has the properties of adhesion, stability, elasticity, provision of mechanical support, and resistance to solvents and heat. An example is given in which the epoxy comprises resin, fine particles of elemental boron, and a polyamide hardener. The epoxy is mixed with solvents and sprayed or brushed onto the electrical components being protected, in this case a satellite TWTA EPC.

16 Claims, No Drawings

HIGH VOLTAGE HIGH VACUUM COATING

TECHNICAL FIELD

This invention pertains to the field of avoiding or minimizing the deleterious effects of patch charging, which typically occurs in high voltage high vacuum environments and can cause insulation breakdown and concomitant flashover between high voltage electrical conductors.

BACKGROUND ART

Sudarshan, T. S., et al., "The Effect of Chromium Oxide Coatings on Surface Flashover of Alumina Spacers in Vacuum", *IEEE Transactions on Electrical Insulation*, Vol. EI-11, No. 1, March 1976, pp. 32-36, discloses the use of chromium oxide coatings in a high voltage high vacuum environment. Compared with the coating of the instant invention, this chromium oxide coating (1) has a very high Z (atomic number), which makes it unsuitable for use in a nuclear environment; (2) is not a conformal coating because it does not provide mechanical support to the items being coated; and (3) is difficult to apply in that it has to be vacuum deposited, whereas the present invention can be sprayed or brushed onto the electrical circuit.

U.S. Pat. No. 3,947,373 discloses a thermally conducting and electrically insulating resin composition suitable for use in high temperature high humidity conditions. Compared with the present invention, the composition disclosed in this reference: (1) uses boron oxide, a nonconductor, rather than elemental boron, a semiconductor; (2) does not protect electrical circuits against patch charging; (3) electrically insulates, but does not leak off excess electrical charges; (4) is not suitable for use in a vacuum, where humidity is zero; (5) has a surface resistivity of at least $10^{10}$ ohms-cm (about $10^{12}$ ohms per square), whereas the present invention has a maximum surface resistivity of $10^{12}$ ohms per square; and (6) uses magnesium oxide, which has an undesirably high secondary electron emission coefficient (SEEC).

U.S. Pats. Nos. 3,779,988 and 3,843,675 disclose techniques for fabricating composite material using elongated boron fibers. Such composites differ from the coating of the present invention in that: (1) the boron fibers are vastly bigger than the present invention's boron particles, which have a maximum size of 20 microns; (2) the reference composites are not thin coatings having thicknesses of less than 0.01 inch which conformally coat electrical components; and (3) the boron fibers are introduced to give mechanical strength to the composite, not to regulate the electrical characteristics of the substance; no suggestion is made for using the composites to solve the problem of flashovers in a high voltage high vacuum environment.

U.S. Pat. No. 3,649,542 discloses a composition which, when applied to an insulator, counteracts the adverse consequences of voids in the insulator. The substance comprises polyethylene and less than 10% by weight of metallic salts of xanthogenic acid.

DISCLOSURE OF INVENTION

The present invention is a conformal coating suitable for avoiding or otherwise minimizing the deleterious effects of patch charging in a high voltage high vacuum environment. By "conformal" is meant that the coating gives mechanical strength to the electrical components (e.g., resistors, capacitors, inductors, transistors, transformers, conductors, insulators) being coated, and adhesively conforms to the shape of said components. The coating comprises a semiconductor powder having a low atomic number (Z) uniformly dispersed throughout an organic binder such an epoxy. The semiconductor is preferably boron, but may also be silicon carbide or boron carbide.

The surface resistivity of the coating is at most $10^{12}$ ohms per square; thus, any patch charge is siphoned off to a nearby electrode. On the other hand, the coating's surface resistivity is high enough so that the coating acts as an electrical insulator. For a typical application, this means that the surface resistivity is at least a hundred times greater than the highest resistance of the electrical components being coated.

The weight percentage of boron or other semiconductor power in the finished, dried coating is typically between 40% and 80%, as required to give the desired surface resistivity. The coating is typically applied to a thickness of no more than 0.01 inch, and can be sprayed or brushed onto the electrical components with the addition of appropriate solvents and diluents.

The coating's constituents have atomic numbers of less than 13, making the coating useful in a nuclear environment. The coating has a secondary electron emission coefficient (SEEC) as close to 1 as possible, to inhibit the buildup of patch charging. The coating has the additional desirable properties of adhesion, stability, elasticity, provision of mechanical support, and resistance to solvents and heat.

The coating also exhibits acceptable outgassing characteristics. Voids, which could allow for undesirable corona charges, are not unnecessarily created.

BEST MODE FOR CARRYING OUT THE INVENTION

This invention has particular applicability in a high voltage high vacuum environment, such as coating the electrical power conditioner (EPC) of a high power (several kilovolt) TWTA (traveling wave tube amplifier) on board a satellite, or coating high voltage high vacuum earthbound circuit breakers. Such high voltage components may be bombarded with electrons emanating from the high voltage field itself, or from outside sources such as cosmic rays, X-rays, gamma rays, light photons, and nuclear particles, all of which can cause "secondary" electrons to be emitted from the surface of the electrical insulators surrounding the high voltage conductors. This emission of secondary electrons results in the undesirable phenomenon known as "patch charging", in which unwanted positive or negative charges accumulate on the surfaces of said electrical insulators. These unwanted charges provide an ionization path along the surface of the insulator, resulting in a breakdown of the dielectric properties of the insulator, and an unwanted sudden flashover (arc) between neighboring conductors that are separated by high electrical potential. Patch charging is a function of the SEEC of the insulator material. When the SEEC is not equal to 1, patch charging occurs. The SEEC, in turn, is a function of the energy of the bombarding radiation or particle.

Patch charging is not a problem in a low vacuum or air atmosphere, because moisture particles in such an atmosphere provide a path for patch charges to trickle off to the nearest conductor before said charges can accumulate to levels that would cause flashover.

The present invention minimizes the problem of patch charging by providing a conformal coating over the electrical components. The conformal coating has a peak SEEC close to 1, inhibiting patch charging at certain incident energies. Since the SEEC of any material varies as a function of the incident energy, the SEEC cannot be uniformly 1 over all energies. The next best alternative is to have the peak SEEC approximately 1, and the SEEC at other incident energies be less than 1. The conformal coating described herein has the desirable property.

The present coating is also a low Z material, in that the atomic numbers of its constituents are 1, 5, 6, 7, and 8. Because of this, incident X-rays, gamma rays, and high energy nuclear particles are not able to release significant amounts of nuclear debris from the coating. Thus, the coating is suitable for use in a nuclear environment.

The coating, by means of varying the weight percentage of boron or other semiconductor powder, is made to have a surface resistivity of no more than $10^{12}$ ohms per square. This is desirable, because patch charges which do occur (due to the SEEC being unequal to 1 for certain energies) are siphoned off to the nearest conductor in contact with the coating. On the other hand, the coating is tailored to have a surface resistivity greater than (typically at least a hundred times greater than) the highest resistance of the electrical components being coated, including the resistance of the dielectric board on which said electrical components are mounted. This is so the coating will act as an insulator and not disrupt the electrical operation of the circuit being coated. In the example illustrated herein of a satellite TWTA EPC, the highest resistance in the circuit is $10^8$ ohms; therefore, the amount of boron in the coating is selected so that the surface resistivity of the coating is between $10^{10}$ and $10^{12}$ ohms per square.

In measuring the coating's surface resistivity, a 1 mil thick film of the coating in the shape of a square is uniformly spread on a flat surface of a dielectric having a surface resistivity much greater than that of the coating. The length of the each side of the square does not matter, as long as the resistivity measurement is taken across one of said sides. Thus, if the square is 5"×5", the measuring electrodes are 5 inches apart.

The organic binder should have a low Z (less than 13); provide the conformal coating attributes of adhesion, flexibility, flowability, toughness, and reworkability; and retain these attributes over time. When a carefully chosen epoxy is used for the organic filler, these attributes can be realized; furthermore, the epoxy eliminates the need for primer coatings. This is desirable, because typical primers are susceptible to breakdown of their dielectric properties in the presence of a high voltage electrical field. An epoxy having a SEEC of 1 or just under 1 should be selected.

A detailed example of a suitable coating manufactured according to the teachings of the present invention, and its application to coating a high voltage satellite TWTA EPC, will now be presented. The coating covers the high voltage module assemblies, and inside metallic chassis surfaces, of the EPC. These items are hereinafter called "EPC items". The high voltage module assemblies comprise dielectric boards made from Stycast 2850 FT (an epoxy-amine casting resin). Various electrical components are mounted on the module assembly boards.

The following materials and equipment are utilized:
1. Materials:
    (a) Two-part epoxy cement (Hysol 0151 Patch Kit);
    (b) epoxy resin, bisphenol-A epichlorohydrin type (trade name Dow Chemical Co. DER 332);
    (c) polyamide resin hardener (trade name Henkel Versamid V-140;
    (d) amorphous boron powder (such as Kerr McGee 90%–92% elemental boron, which satisfies MIL-B-51092);
    (e) flow control resin (trade name Monsanto Modiflow);
    (f) n-butyl alcohol diluent, electronic grade, ASTM D 304;
    (g) xylene diluent, electronic grade, ASTM D 846;
    (h) toluene diluent, technical grade, TT-T-548;
    (i) glycol ether propylene diluent (trade name Dow Chemical Co. Dowanol PM);
    (j) glycol ether propylene diluent (trade name Dow Chemical Co. Dowanol BC-200);
    (k) glycol ether dipropylene diluent (trade name Dow Chemical Co. Dowanol DPM);
    (l) methyl ethyl ketone solvent, electronic grade;
    (m) isopropyl alcohol solvent;
    (n) dry nitrogen gas having a maximum dew point of −65° C.; and
    (o) Freon TMC solvent.
2. Equipment:
    (a) Laboratory balance having a sensitivity of 0.01 gram;
    (b) forced air circulating or convection oven capable of maintaining specified temperatures within 5° C.;
    (c) spray gun capable of even dispersion of coating;
    (d) spray booth having adequate ventilation;
    (e) synthetic nylon bristle brush;
    (f) ball mill such as a Roalox burundum fortified jar filled with 400 grams of ½"×½" burundum cylinders;
    (g) vapor degreaser with spray attachment;
    (h) mixing containers, disposable polyethylene or polypropylene beakers, or similar inert containers;
    (i) power mixer;
    (j) paint shaker such as the one bearing the trade name Red Devil; and
    (k) fineness of grind paint gauge such as Hedgeman type VWR Model #52628-000.

The conformal coating has two major components, which are henceforth denominated Part A and Part B. Part A is the boron-impregnated resin, and Part B is the Versamid V-140 polyamide hardener. Organic diluents and solvents are added for processability, but subsequently evaporate.

A batch of Part A comprises the following: 293 grams of DER 332 ±2 grams; 360 grams of the 90%–92% boron ±2 grams; 15 grams of the n-butyl alcohol ±1 gram; 75 grams of the xylene ±2 grams; 100 grams of the Dowanol PM ±2 grams; 100 grams of the Dowanol BC-200 ±2 grams; 10 grams of the Dowanol DPM ±1 gram; and 1 gram of the Modiflow ±0.01 gram.

To the DER 332 are sequentially added, in the following order, using hand mixing, the following: the Dowanol PM; the xylene; the n-butyl alcohol; the Dowanol BC-200; the Dowanol DPM; and the Modiflow. The boron particles, which have a uniform particle size of between 0.5 microns and 2 microns, are than stirred in, using a power mixer.

The above mixture is then emptied into a ball mill jar filled with 400 grams of ½"×½" burundum cylinders. The mixture is ball milled for 24 to 48 hours. After completion of the milling procedure, the Part A material is emptied into a quart size paint container. It is prudent to label the date of milling, and the lot numbers of the DER 332, boron, and Modiflow. The milled mixture should meet a fineness of grind rating better than 5 to 8 as measured on the Hedgeman scale per ASTM D 1210. The milled Part A is set aside for further mixing. Its shelf life is 6 months.

The EPC items are vapor degreased in a Freon-TMC vapor degreaser. All items to be coated are sprayed thoroughly to remove all flux residues and contamination. The EPC items are then flushed with methyl ethyl ketone (caution: methyl ethyl ketone can be toxic in confined or poorly ventilated spaces); flushed with isopropyl alcohol; allowed to drain for at least one minute; then blow dried with dry nitrogen. The EPC items are then oven dried in a forced air or convection oven at 100° C. for 15 to 30 minutes. Stycast 2850 FT is soft and flexible at 100° C.; boards fabricated of this material must be adequately supported so that they are not damaged or bent during any period that said boards are subjected to temperatures above 50° C.

The EPC items are then cooled to room temperature. All electrical components are bonded and filleted to the appropriate module assembly board, if not already done so. If there are any long unsupported insulated wire leads requiring tacking-down (bonding to the module assembly boards), this is done using the two-part Hysol 1510 epoxy cement.

Coating operations should start as soon as the items to be coated reach room temperature. If required to facilitate process flow, the items are held in a clean oven at 40° C. to 65° C. for two to three hours. Clean surfaces that are not coated within eight hours should be re-cleaned.

Now we are ready to mix and apply the conformal coating. Part A is homogenized by shaking using the paint shaker. Part A and Part B (which is comprised solely of Versamid V-140) are weighed out and mixed in the ratio of 25 parts by weight of Part A to 4 parts by weight of Part B. After Part A has been mixed with Part B, the new mixture is allowed to stand for an induction period having a duration of between one hour and four hours. The purpose of the induction period is to allow some cross-linking in the epoxy before the coating is laid down as a thin film.

Since the pot life of the coating is 12 hours from the time of Part B addition, the coating container must be covered when not actively used so that any solvent loss is minimized. In particular, the mixture is covered during the induction period.

The coating may now be either sprayed or brushed onto the items being coated.

If the coated is to be sprayed on, 10 grams of toluene are added to each 29 grams of the coating to form a spray mixture. The spray mixture is poured into a spray gun container. The spray gun is assembled and connected to a dry nitrogen supply. For safety reasons, the spraying is done only inside a paint spray booth, fume hood, or similar facility with adequate ventilation. All surfaces (including board edges) of the module assembly boards are sprayed evenly to obtain a dry film thickness of 1 to 5 mils. Teflon surfaces of high voltage interconnecting wires may or may not be coated. The inside EPC chassis surfaces are sprayed with one coat of the spray coating. The EPC items are cured for a minimum of 30 minutes at room temperature, and then for a minimum of 2 hours at 100° C.±5° C.

If the coating is to be brushed on, 5 grams of xylene are added to each 29 grams of the mixed coating. Then another 4 hour induction period is entered, for a total of 8 hours of induction. Then, 5 more grams of xylene is added to the mixture.

Brush coating should start just as the items to be coated cool to room temperature. A thin uniform coat of the conformal coating is applied to all the surfaces of the module assembly boards, and to the inside chasses surfaces, using a clean synthetic nylon bristle brush. The dry film thickness should be approximately 1 to 3 mils. All the fillets are made small, and webbing is avoided. Teflon surfaces of high voltage interconnecting wires may or may not be coated. The EPC items are cured for 1 to 2 hours at room temperature, plus a minimum of one additional hour at 100° C.±5° C.

Now a thin uniform second coat of the coating is applied with the same brush to all surfaces on the component sides of the module assembly boards. The dry film thickness of the second coat should be approximately 1 to 3 mils. All the fillets are made small, and all webbing is avoided. Once again, the coating operation should start just as the items to be coated cool to room temperature. The boards are cured for 1 to 2 hours at room temperature, plus an additional 2 hours minimum at 100° C.±5° C. The assembly of the EPC's is then completed.

The cured conformal coating should be uniform, free of any sharp points or bubbles, and visually smooth. Occasional blushing, crazing, and embedded nylon brush hairs are acceptable, as are bubbles which have been broken such that their interiors are exposed. Fillets should evidence a slight concave surface. Webbing is not permitted. Small discontinuities of coating on wire insulation are not cause for rejection. All coatings should be a minimum of 1 mil in dry film thickness. The coated EPC modules are tested for the desired resistivity, and for adhesion.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, instead of using DER 332 and Versamid 140 for the binder, one could use other epoxies, polyesters, or polyimides, or combinations of these ingredients.

What is claimed is:

1. A conformal coating for electrical components, comprising:
    particles of elemental boron having a maximum particle size of 20 microns and uniformly dispersed throughout an organic binder having a secondary electron emission coefficient approximately equal to 1; wherein
    the surface resistivity of the coating is between a preselected minimum and $10^{12}$ ohms per square, said preselected minimum being equal to a hundred times the highest resistance of the electrical components being coated; and
    the thickness of the coating is less than 0.01 inch.

2. The coating of claim 1 wherein the binder comprises an epoxy plus a hardener.

3. The coating of claim 1 wherein the weight percentage of boron in the coating, when dry, is between 40% and 80%.

4. The coating of claim 1 wherein all elemental constituents of the coating have an atomic number of less than 13.

5. The coating of claim 1 wherein the coating is brushed onto the electrical components.

6. The coating of claim 1 wherein the coating is sprayed onto the electrical components.

7. A less than 0.01 inch thick conformal coating for coating electrical components to inhibit flashovers in a high voltage, high vacuum environment, said coating comprising:
- particles of a semiconductor, having a maximum particle size of 20 microns, dispersed throughout an organic binder, wherein:
- all elemental constituents of the coating have an atomic number of less than 13; and
- the surface resistivity of the coating is between a preselected minimum and $10^{12}$ ohms per square, said preselected minimum being equal to $10^2$ times the highest resistance of the electrical component being coated.

8. A method for making a conformal coating, comprising the steps of:
- forming a Part A mixture comprising an epoxy resin, fine particles of elemental boron having a maximum particle size of 20 microns, and organic diluents;
- adding to the Part A mixture a polyamide which acts as a hardener to form a coating precursor; and
- allowing the coating precursor to stand for an induction period, which is a time sufficient for partial but not total cross-linking to occur in the epoxy, to form the conformal coating.

9. The method of claim 8 wherein there are approximately 4 parts by weight of the polyamide hardener for each 25 parts by weight of the Part A mixture.

10. The method of claim 8 wherein the Part A mixture comprises approximately equal parts by weight of epoxy resin and boron.

11. The method of claim 8 wherein the Part A mixture comprises approximately 293 parts by weight of epoxy resin, 328 parts by weight of elemental boron, and 1 part by weight of a flow control resin.

12. The method of claim 8 wherein the epoxy resin is bisphenol-A epichlorohydrin, and the diluents are selected from the group consisting of n-butyl alcohol, xylene, glycol ether propylene, and glycol ether dipropylene.

13. A method for protecting an electrical circuit used in a high voltage high vacuum environment from flashovers caused by patch charging, said method comprising the steps of:
- forming a Part A mixture comprising an epoxy resin and fine particles of elemental boron having a maximum particle size of 20 microns;
- adding a polyamide which act as a hardener to the Part A mixture to form a coating precursor;
- adding a solvent to the coating precursor to form a conformal coating; and
- applying a thin film of the conformal coating less than 0.01 inch thick onto the circuit being protected.

14. The method of claim 13 wherein the applying step is performed by spraying the coating onto the circuit with a spray gun.

15. The method of claim 13 wherein the applying step is performed by brushing the coating onto the circuit with a bristle brush.

16. The method of claim 13 further comprising the additional step of curing the coated circuit at an elevated temperature.

* * * * *